United States Patent [19]

Zapp et al.

[11] 3,864,229

[45] Feb. 4, 1975

[54] POLYTHIOL ACCELERATED RADIATION CROSS-LINKING OF OLEFINICALLY UNSATURATED POLYMERS

[75] Inventors: Robert L. Zapp, Short Hills; Alexis A. Oswald, Mountainside, both of N.J.

[73] Assignee: Exxon Research and Engineering Company, Linden, N.J.

[22] Filed: Mar. 6, 1972

[21] Appl. No.: 232,275

[52] U.S. Cl... 204/159.18, 204/159.14, 204/159.15, 260/23 XA, 260/23 H, 260/235, 260/79, 260/79.5 L, 260/79.5 P, 260/79.5 NV
[51] Int. Cl............................ B01j 1/10, B01j 1/12
[58] Field of Search....... 204/159.2, 159.14, 159.18; 260/79, 79.5 C

[56] References Cited
UNITED STATES PATENTS 3,338,810    8/1967    Warner.......................... 204/159.18
3,625,925   12/1971    Oswald et al................... 204/159.18
3,662,023    5/1972    Kehr et al............................ 260/858
3,700,574   10/1972    Kehr et al...................... 204/159.15
3,725,229    4/1973    Kehr et al...................... 204/159.15

*Primary Examiner*—Paul Lieberman
*Assistant Examiner*—Richard B. Turner

[57] ABSTRACT

Improved radiation vulcanization of elastomers is accomplished by incorporating into the elastomer composition a polythiol. The polythiol is preferably a hydrocarbon thioether thiol and is normally liquid at room temperature with a molecular weight of at least 150. Though difunctional polythiols are operative in this invention, the preferred polythiols have about three to about five thiol groups per molecule.

15 Claims, No Drawings

POLYTHIOL ACCELERATED RADIATION CROSS-LINKING OF OLEFINICALLY UNSATURATED POLYMERS

BACKGROUND OF THE INVENTION

Radiation curing of polymers is well known in the art. Though difficulties have been encountered in radiation curing or vulcanizing of polymers, improved results have been obtained by the use of additives. For example, in the case of polyethylene, it has been demonstrated that the addition of unsaturated polyfunctional monomers will produce comparable cross-link densities at reduced dose levels, in contrast to the radiation of ordinary polyethylene.

It is well known that polymers such as polyisobutylene are effectively destroyed when exposed to ionizing radiation. See for example, "Calorimetric Study of Radiation Crosslinking of Polyisobutylene In The Presence Of Monomer Additives," Dokl. Akad. Nauk SSSR (Phys. Chem.) 193 (4), 855–857 (1970). The addition of small amounts of polyfunctional monomers such as p-divinylbenzene causes effective crosslinking of polyisobutylene as does the addition of acrylonitrile to polyisobutylene blends. Allyl acrylate has also been found to cause crosslinking of polyisobutylene under ionizing radiation conditions, see for example Polymer Letters, 2, pages 819–821 (1964). Although crosslinking does occur, degradation of the polyisobutylene results even in the presence of the allyl acrylates or allyl methacrylates at higher dose levels, e.g., above about 0.8 megarads.

Butyl rubber being substantially polyisobutylene also, not surprisingly, has been found to degrade in the presence of ionizing radiation.

The use of dithiols in the conventional curing of polymers is well known in the art. For example, the heat curing of a cellulose methacrylate derivative with simple dithiols is disclosed in British Pat. No. 588,018. Sulfur vulcanization of styrenebutadiene is accelerated by the addition of bis-mercaptophenyl diphenyl oxide (see, for example, U.S. Pat. No. 3,326,822). Chlorinated butyl rubber has been vulcanized with dithiols. See, for example, Hodges, *Rubber Plastics Weekly* 141 pages 666–668 (196) wherein glycol dimercapto acetate is recommended because of its low odor.

Elastomers have been prepared from long-chain dithiols with long-chain diolefins using as the crosslinking agent triolefin or long-chain trithiols; see, for example, Klotz et al, *I and EC Product Research and Development* 7, pages 165–169 September (1968).

SUMMARY OF THE INVENTION

It has been found that olefinically unsaturated elastomers, particularly halogenated butyl rubber, styrene-butadiene rubber, polybutadiene, etc., may be vulcanized using ionizing radiation. Surprisingly, the conveying radiation induced vulcanization of halogenated butyl rubber and polydiene rubbers can be markedly accelerated by the addition of polythiols into the elastomer composition prior to exposure to radiation. The polythiols which are suitable for use in this invention are polyfunctional thiols having at least 2 preferably 3 thiol groups. The polythiol is preferably a liquid low molecular weight compound having a molecular weight of at least 150.

The preferred polythiols are polythiol ethers or other hydrocarbon polythiols. Other types of functionality may be introduced into the molecule such as carbonyl groups, etc.

DETAILED DESCRIPTION OF THE INVENTION

This invention relates to a method of radiation vulcanization of olefinically unsaturated elastomers such as halogenated butyl rubber polybutadiene and styrene butadiene rubber (SBR), which comprise incorporating into the elastomer composition a crosslinking agent wherein the crosslinking agent is a polythiol. In particular this invention relates to the improvement in radiation vulcanization of polybutadiene, halogenated butyl rubber and SBR wherein the polythiol has an average of at least three thiol groups and is normally liquid at room temperature having a molecular weight of at least 150 and preferably less than 3,000. More preferably, the polythiol is normally liquid at ambient temperatures.

The term "butyl rubber" as employed in the specification and claims is intended to include copolymers made from the polymerization of reactant mixtures having therein about 70 to about 99.5 percent by weight of an isoolefin which has about 4 to 7 carbon atoms, e.g., isobutylene, and about 0.5 to 30 percent by weight of a conjugated multiolefin having about 4 to about 14 carbon atoms, e.g., isoprene, piperylene, cyclopentadiene, etc. The resulting copolymer contains 85 to 99.8 percent by weight of combined isoolefin, and about 0.5 to about 15 percent of combined multiolefin. Butyl rubber generally has a Staudinger molecular weight of about 20,000 to about 500,000, preferably about 25,000 to about 400,000, especially about 100,000 to about 400,000, Wijs Iodine number of about 0.5 to about 50, preferably about 1 to about 15.

The preparation of butyl rubber is described in U.S. Pat. No. 2,356,128 which is incorporated herein by reference.

For the purpose of this invention, the butyl rubber may have incorporated therein about 0.2 to about 10 mole percent of combined multiolefin, preferably about 0.5 to about 6 percent, more preferably about 1 to about 4 percent, e.g., 2 percent. Illustrative of such a butyl rubber is Enjay Butyl 268 (Enjay Chemical Company) having viscosity average molecular weight of about 450,000, a mole percent unsaturation of about 1.5 percent and a Mooney viscosity of about 55° at 260°F.

Halogenated butyl rubber is commercially available and may be prepared by halogenating butyl rubber in a solution containing about 1 to about 60 percent by weight of butyl rubber in a substantially inert $C_5$–$C_8$ hydrocarbon solvent, such as pentane, hexane, heptane, etc., and contacting this butyl rubber cement with a halogen gas for a period of about 25 minutes, whereby halogenated butyl rubber and a hydrogen halide are formed; the copolymer containing up to 1 halogen atom per double bond in the copolymer.

The preparation of halogenated butyl rubber is old in the art, see for example U.S. Pat. No. 3,099,644 which is incorporated herein by reference. This invention is not intended to be limited in any way by the manner in which butyl rubber is halogenated, and both chlorinated and brominated butyl rubber are suitable for use in this invention.

Illustrative of halogenated butyl rubbers is Enjay Butyl HT-10-66, a chlorinated butyl rubber containing about 1.3 weight percent chlorine having about 1.7 mole percent unsaturation and a viscosity average molecular weight of about 357,000.

Styrene butadiene rubber (SBR) is well known to the art. Typically these polymers contain about 5 to about 40 weight percent of styrene and have a Wijs Iodine Number of about 300 to about 5,000 and a number average molecular weight of about 30,000 to about 600,000, preferably about 100,000 to about 150,000. The polymer may be prepared either by the bulk polymerization of styrene and butadiene or polymerization of the rubber in a letex form by emulsion polymerization, a suspension polymerization. This invention is in no way intended to be limited by the method of preparation of the styrenebutadiene rubber.

Polybutadiene is well known in the art and may be prepared in various ways including butyl lithium catalysis of butadiene. Illustrative examples of polybutadiene are: Firestone Diene 55 having 45 percent 1,4 cis enchainment, 45 percent 1,4 trans enchainment and 10 percent 1,2 vinyl pendant groups; Phillips' Cis 4 having 92 percent 1,4 cis, 2 percent 1,2 adduct of butadiene and some 1,4 trans enchainment.

Other elastomers suitable for use in the practice of this invention include polychloroprene and acrylonitrile-butadiene copolymer.

The term "ionizing radiation" as used in the specification and claims is intended to include gamma radiation and electron beam (βray) irradiation.

The $Co^{60}$ gamma radiation source referred to in the Examples of this specification is a 2,900 Curie source (1.2 Mev). Electron beam irradiation was produced from a Dynamitron. For a description of this equipment, see Harmer, and Ballentine "Radiation Processing," *Chemical Engineering*, pages 98-116 (Apr. 19, 1971). Although gamma radiation has greater penetrating power than electron beams, this characteristic was not a factor in these experiments since the test samples were 100 mil sheets or less. Where significant differences occur between the results from $Co^{60}$ and electron beam irradiation, it is attributable to differences in dose rate, the former at 0.01 megarad/minute and the latter at 30 megarad/minute.

Any polythiol having at least two thiol groups which has a molecular weight of at least 150, may be used in the practice of this invention. Although the polythiol structure may include other atoms besides carbon, hydrogen, and sulfur; e.g., nitrogen, or oxygen in the form of amides, ethers, esters, etc., the preferred polythiols are hydrocarbon polythiol ethers. The preferred polythiols have a molecular weight of about 150 to about 3,000 preferably and have at least 2, preferably about 3 to about 5 thiol groups per molecule; more preferably, about 200 to about 1,000;

Illustrative examples of these thiols are the reaction product of trivinylcyclohexane and 1,3-propanedithiol, which has the general formula

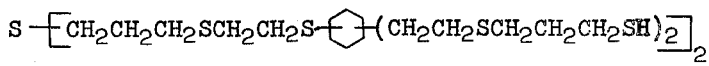

Trimethylol propane tris-thiolglycoate, pentaerythritol tetra 3, mercaptopropionate, pentaerythritol tris-3-mercaptopropionate, the reaction product of cyclododecatriene and 1,3-propanedithiol, which is a mixture of thioether thiols having the general formula

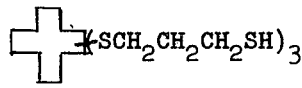 and 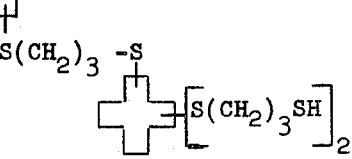

Calc. Mol Wt. 487

Calc. Mol Wt. 757

Trimethylol propane tris-mercaptoacetate, the reaction product of $H_2S$ and/or dithiols with polyepoxides. See U.S. Pat. No. 3,625,925 incorporated herein by reference for other suitable polythiols and their method of preparation.

The advantages of the instant invention may be more readily appreciated by reference to the following examples.

EXAMPLE 1

A polythioether polythiol, formed by the reaction product of trivinylcyclohexane and 1,3-propane dithiol was used as the vulcanizing crosslinking agent. This compound has the general formula

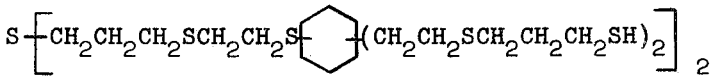

The calculated molecular weight of the polythiol is 912, but the actual molecular weight determined by vapor pressure osmometry was 818. This product was designated E2323 III. It contains 0.0049 mole equivalents of SH per gram.

The polythiol was compounded with SBR and natural rubber (NR) according to the formulations shown in Table I.

TABLE I

| POLYTHIOETHER POLYTHIOL IN SBR AND NATURAL RUBBER | | | | | | |
|---|---|---|---|---|---|---|
| Component | 1 | 2 | 3 | 4 | 5 | 6 |
| SBR 1502[2] | 100[1] | 100 | 100 | | | |
| Natural Rubber | | | | 100 | 100 | 100 |
| Zinc Oxide | 5 | 5 | 5 | 5 | 5 | 5 |
| Stearic Acid | 1 | 1 | 1 | 1 | 1 | 1 |

TABLE I—Continued

POLYTHIOETHER POLYTHIOL IN SBR AND NATURAL RUBBER

| Component | 1 | 2 | 3 | 4 | 5 | 6 |
|---|---|---|---|---|---|---|
| E2323 III | — | 2.3 | 4.6 | — | 2.3 | 4.6 |
| Moles SH/Gram Elastomer | — | 0.011 | 0.022 | — | 0.011 | 0.022 |

[1] Emulsion polymerized at 50°F comprising about 23.5% styrene having a Mooney Viscosity at 212°F of 52
[2] All amounts as parts per hundred of elastomers by weight.

It was observed in other radiation curing experiments that the presence of zinc oxide provided an added accelerating effect to that of the polythiol. Thus, the control compounds in both elastomer blends contain this ingredient. Sample compounds were molded at 175°F for 5 minutes to form a 0.025 inch film protected with Mylar; prior to radiation all samples were soluble in cyclohexane. Samples were then exposed to electron beam radiation at 30 megarads per minute for 2.5, 5, 10, and 15 MR. Network properties were determined by volume swelling in cyclohexane and converted to the parameters of Mc and XL/cc, wherein Mc is Molecular weight between crosslinks and XL/cc is crosslinks per cc. The results are shown in Table II.

swelling derived network parameters. Generated crosslink densities are increased 2 to 3 fold at the higher dose levels of 10 and 15 MR while displaying evidences of network formation at the 5 MR level. The control composition 4 has not formed a desirable network at this point. This lower reactivity or response to the polythiol is a reflection of the substituted internally unsaturated isoprenoid structure of cis-polyisoprene.

EXAMPLE 2

Chlorinated butyl rubber under radiation tends to quickly reach a crosslinking limit where further radiation begins to promote chain scission. It is also dose rate sensitive so that as the rate of energy absorption is

TABLE II

Effect of Electron Beam Exposure

| Physical Properties at Electron Beam Exposure of: | SBR 1 | 2 | 3 | 4 | NR 5 | 6 |
|---|---|---|---|---|---|---|
| 0 Megarads | | Soluble | | | Soluble | |
| 2.5 MR | | | | | | |
| % Vol. Increase | | 443 | 328 | | Loose Gel | |
| % Soluble | Loose | 10.4 | 9.2 | | | |
| Mc × $10^{-3}$ | Gel | 9.2 | 6.0 | | | |
| XL/cc × $10^{-19}$ (Orig. Pol. Vol.) | | 2.69 | 4.42 | | | |
| 5 MR | | | | | | |
| % Vol. Increase | 2300 | 316 | 242 | Loose | 2765 | 2420 |
| % Soluble | 40 | 7.7 | 7.0 | Gel | 26.3 | 24.6 |
| Mc × $10^{-3}$ | 110 | 5.6 | 3.9 | | 135 | 102 |
| XL/cc × $10^{-19}$ | .14 | 4.63 | 6.7 | | .16 | .20 |
| 10 MR | | | | | | |
| % Vol. Increase | 949 | 279 | 202 | 1940 | 1078 | 1006 |
| % Soluble | 19.6 | 7.0 | 6.3 | 20.1 | 11.7 | 11.4 |
| Mc × $10^{-3}$ | 29 | 4.7 | 2.9 | .78 | 32 | 29 |
| XL/cc × $10^{-19}$ | 0.76 | 5.48 | 8.9 | .30 | .81 | .89 |
| 15 MR | | | | | | |
| % Vol. Increase | 595 | 251 | 187 | 1170 | 752 | 716 |
| % Soluble | 12.8 | 6.5 | 5.9 | 12.1 | 7.9 | 8.0 |
| Mc × $10^{-3}$ | 14.2 | 4.0 | 2.7 | 36 | 18 | 16.5 |
| XL/cc × $10^{-19}$ | 1.68 | 6.53 | 9.71 | .71 | 1.47 | 1.57 |

The effect of the polythiol on the radiation induced crosslinking of SBR is extremely great at the levels used. This can be noted especially at the lower levels of radiation dose wherein percent volume increase, percent soluble and Mc are all markedly lower, and crosslinked densities are manyfold greater. This is evident also at higher dose levels. The emulsion polymerization of butadiene would be random in nature with considerable 1,2 addition resulting in very reactive pendant vinyl groups. The effect with natural rubber is much less pronounced but still evident on the basis of increased, reaction selectivity is shifted from crosslinking to chain scission. In contrast to more highly unsaturated general purpose elastomers, a mild radiation precure of a compounded formulation detracts from a subsequent thermal curing process. The radiation-induced crosslinking of chlorinated butyl rubber can be greatly enhanced by small amounts of polythioether polythiols as illustrated by the following experiments.

The polythiol used is the reaction product of cyclododecatriene and 1,3 propane dithiol, designated E1255 VII. The polythiol is a mixture of the following compounds:

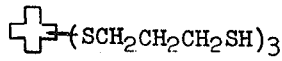   and   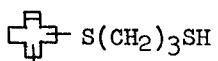
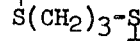
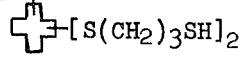

calc. mol. wt. 487          calc. mol. wt. 757

The molecular weight of the mixture by Vapor Pressure Osmometry was found to be 578. For purposes of compounding, the functionality per unit weight was based on VPO molecular weight of 578 or approximately 0.005 SH/gm. See U.S. Pat. No. 3,625,925 incorporated herein by reference for methods of preparing this polythiol. The glycol dimercapto acetate has a functionality of 0.0095 SH/gm. Table III shows blends prepared for a comparison of E1255 VII and the glycol dimercapto acetate in the radiation crosslinking of chlorinated butyl rubber.

TABLE III

|  | 1 | 2 | 3 | 4 |
|---|---|---|---|---|
| Chlorinated butyl rubber[1] HT 10–68 | 100 | 100 | 100 | 100 |
| Zinc Oxide | — | 5 | 5 | 5 |
| Glycol Dimercapto Acetate |  |  | 2 |  |
| E1255 VII |  |  |  | 2 |

[1]chlorinated butyl rubber of about 450,000 viscosity average molecular weight having 1.3 weight % chlorine and 1.7 mole % unsaturation.

The chlorinated butyl rubber used has approximately 0.032 equivalent Cl functionality per 100 grams. Two grams of E1255 VII polythiol is the equivalent to the addition of 0.01 SH groups per 100 grams of chlorinated butyl rubber. One hundred grams of chlorinated butyl rubber contain 0.032 allylic chlorine groups.

The compounds of Table III were molded as 0.025 inch at 200°F. for 5 minutes between mylar film and exposed to Cobalt 60 radiation for various time periods. After exposure, the film was subjected to solvent swelling analysis in a cyclohexane to determine the extent of crosslinking. The results are tabulated in Table IV.

A comparison of columns 1 and 2 shows that zinc oxide has a very mild activating effect upon the radiation-induced crosslinking of chlorinated butyl rubber. The presence of glycol dimercapto acetate provides little or no additional benefit (column 3). On the other hand, the addition of E1255 VII polythiol (column 4) provides a marked enhancement or radiation-induced crosslinking. By any criterion: lower volume swelling, soluble polymer, molecular weight Mc or crosslinked density (XL/cc), the polythioether polythiol has a marked accelerating effect. On the basis of crosslinks formed, it provides about a threefold increase over the control of column 2 and an increase of about 2-½ times over the dimercaptan of column 3.

EXAMPLE 3

In order to study the concentration effect of E1255 VII polythiol of Example 2 on radiation curing, samples were prepared in the manner of Example 2 at various polythiol concentrations. The samples were molded at 175°F. for 5 minutes. The formulations are shown in Table V.

TABLE V

| VARIATION IN E1255 VII CONCENTRATION | | | | | | |
|---|---|---|---|---|---|---|
|  | 0 | 1 | 2 | 3 | 4 | 5 |
| Chlorinated butyl rubber HT-10-68 | 100 | 100 | 100 | 100 | 100 | 100 |
| Zinc Oxide | — | 5 | 5 | 5 | 5 | 5 |
| Stearic Acid | — | 1 | 1 | 1 | 1 | 1 |
| E1255 VII | — | — | 0.5 | 1.0 | 2.0 | 4.0 |

Note: All samples were soluble in cyclohexane before irradiation.

TABLE IV

SWELLING IN CYCLOHEXANE AT ROOM TEMPERATURE
AS A FUNCTION OF MEGARAD DOSE (MR), CO[60] IRRADIATION

| Physical Properties after Co[60] |  | 1 | 2 | 3 | 4 |
|---|---|---|---|---|---|
| 0 MR (Megarads) |  | Soluble | Soluble | Soluble | Soluble |
| 4.3 MR - | % Vol. Increase |  |  |  | 607 |
|  | % Soluble |  |  |  | 3.7 |
|  | $Mc \times 10^{-3}$ (Gel) |  |  |  | 14.2 |
|  | $XL/cc \times 10^{-19}$ (Orig. Volume Basis) |  |  |  | 1.87 |
| 5.5 MR - | % Vol. Increase | 1322 | 1339 | 1162 | 516 |
|  | % Sol. | 10.4 | 8.8 | 9.6 | 3.7 |
|  | $Mc \times 10^{-3}$ | 50 | 54 | 41 | 10.8 |
|  | $XL/cc \times 10^{-19}$ | 0.51 | 0.50 | 0.64 | 2.45 |
| 10.5 MR - | % Vol. Increase | 970 | 870 | 854 | 470 |
|  | % Sol. | 9.8 | 8.0 | 7.8 | 4.3 |
|  | $Mc \times 10^{-3}$ | 30 | 25.5 | 24.5 | 8.6 |
|  | $XL/cc \times 10^{-19}$ | 0.78 | 1.02 | 1.07 | 2.83 |
| 15.2 MR - | % Vol. Increase | 810 | 740 | 751 | 444 |
|  | % Sol. | 10.6 | 7.4 | 8.2 | 4.3 |
|  | $Mc \times 10^{-3}$ | 22.5 | 19.5 | 20 | 8.6 |
|  | $XL/cc \times 10^{-19}$ | 1.11 | 1.32 | 1.29 | 3.1 |

The results of Cobalt 60 exposure are tabulated in Table VI.

TABLE VI

Co⁶⁰ Radiation at .01 MR/min.

| Dose | | Network Properties from Volume Swelling — Cyclohexane | | | | |
|---|---|---|---|---|---|---|
| | | 0 | 1 | 2 | 3 | 4 |
| 4.7 MR — | % Vol. Increase | 1138 | 1203 | 1040 | 843 | 511 |
| | % Sol. | 13 | 11.6 | 11.6 | 7.9 | 3.8 |
| | Mc × 10⁻³ (Gel) | 39 | 43 | 34 | 24.5 | 10.5 |
| | XL/cc × 10⁻¹⁹ (Orig. Pol. Vol.) | .64 | .58 | .72 | 1.09 | 2.45 |
| 10.5 MR — | % Vol. Increase | 915 | 763 | 720 | 624 | 447 |
| | % Sol. | 10.3 | 8.0 | 8.0 | 6.8 | 4.4 |
| | Mc × 10⁻³ | 27 | 20 | 18.5 | 15 | 8.2 |
| | XL/cc × 10⁻¹⁹ | .94 | 1.26 | 1.38 | 1.73 | 3.08 |
| 15.3 MR — | % Vol. Increase | 727 | 645 | 654 | 566 | 406 |
| | % Sol. | 11.6 | 8.0 | 8.0 | 7.2 | 5.0 |
| | Mc × 10⁻³ | 19 | 15.6 | 15.8 | 12.5 | 7.2 |
| | XL/cc × 10⁻¹⁹ | 1.31 | 1.61 | 1.59 | 2.06 | 3.51 |

There is a progressive crosslinking response to the chlorinated butyl rubber system toward radiation as the amount of polythiol is increased. Volume swelling, soluble polymer and Mc between crosslinks all decrease at any given megarad dose level. The generated crosslinked density is increased about 3 to 4 times over the control column 1 at the highest concentration of polythiol.

EXAMPLE 4

The effects of polythioether polythiol E1255 VII on the electron beam irradiation response of chlorinated butyl rubber was evaluated by repeating the experiments of Example 3, substituting electron beam irradiation for Cobalt 60 radiation. The results are shown in Table VII.

TABLE VII

EFFECT OF POLYTHIOETHER POLYTHIOL (E1255 VII) IN INCREASING QUANTITIES OF THE ELECTRON BEAM IRRADIATION RESPONSE OF CHLORINATED BUTYL RUBBER

| Component | 0 | 1 | 2 | 3 | 4 | 5 |
|---|---|---|---|---|---|---|
| Chlorinated butyl Rubber HT-10-68 | 100 | 100 | 100 | 100 | 100 | 100 |
| Zinc Oxide | — | 5 | 5 | 5 | 5 | 5 |
| Stearic Acid | — | 1 | 1 | 1 | 1 | 1 |
| E1255 (VII) | — | — | 0.5 | 1.0 | 2.0 | 4.0 |

Electron Beam at 30 MR/Min.

| Physical Properties after electron beam irradiation at: | | Network Properties from Volume Swelling - Cyclohexane | | | | | |
|---|---|---|---|---|---|---|---|
| | | 0 | 1 | 2 | 3 | 4 | 5 |
| 5.2 MR - | % Vol. Increase | 1830 | 1745 | 1496 | 1280 | 737 | 520 |
| | % Soluble | 15.5 | 14.0 | 12.3 | 11.7 | 6.9 | 6.6 |
| | Mc × 10⁻³ (Gel) | 83 | 76 | 61 | 46 | 19.5 | 11.0 |
| | XL/cc × 10⁻¹⁹ (Orig. Pol. Vol.) | 0.29 | 0.33 | .41 | .55 | 1.35 | 2.34 |
| 9.8 MR - | % Vol. Increase | 1270 | 1182 | 1085 | 978 | 615 | 435 |
| | % Soluble | 18.9 | 15.7 | 16.2 | 13.9 | 9.2 | 7.2 |
| | Mc × 10⁻³ | 47 | 42 | 36 | 31 | 14.4 | 8.1 |
| | XL/cc × 10⁻¹⁹ | .50 | .59 | .67 | .79 | 1.78 | 3.07 |
| 15 MR - | % Vol. Increase | 1121 | 970 | 923 | 792 | 562 | 423 |
| | % Soluble | 17.2 | 14.3 | 14.2 | 13.3 | 8.7 | 7.8 |
| | Mc × 10⁻³ | 39 | 30 | 28 | 21.5 | 12.2 | 8.3 |
| | XL/cc × 10⁻¹⁹ | 0.62 | 0.79 | 0.86 | 1.13 | 2.06 | 3.17 |

Note: All samples were soluble in cyclohexane before irradiation.

It is evident that the presence of the polythioether polythiol promotes gelation and retards chain scission.

EXAMPLE 5

A comparison of various polythiols was made using the polythiols shown in Table VIII.

uated. This rubber had a specification molecular weight of 1,000 and a wt. percent mercaptan range of 5.9 to about 7.7 (average 6.8). This is equivalent to 0.002 SH groups per gram compared to 0.005 SH groups per gram of E1255 VII. Samples were prepared in the manner of Example 4, the polythiols being incorporated in the compositions at equivalent SH function-

TABLE VIII

POLYTHIOETHER POLYTHIOLS DERIVED FROM TRIENE-DITHIOL POLY ADDITIONS DESCRIBED IN U.S. PAT. APPL. SER. NO. 665,728

| Polythiol Reference No. | Mol. Wt. Calc. | Mol. Wt. Found | Thiol Funct. Calc. | Thiol Funct. Found | Chemical Structure and Derivation |
|---|---|---|---|---|---|
| E1255 VII | 487 | 578 | 3 | 2.8 | [—S(CH$_2$)$_3$SH]$_3$ from cyclo-dodecatriene and 1,3 propane dithiol. (2) |
| E1221 VIII | 494 | 500 | 4 | -- | S[CH$_2$CH$_2$—⬡—(CH$_2$CH$_2$SH)$_2$]$_2$ from trivinyl cyclohexane and H$_2$S. (2) |
| E1260 VI | 796 | 897 | 4 | -- | [CH$_2$SCH$_2$CH$_2$—⬡—(CH$_2$CH$_2$S(CH$_2$)$_2$SH)$_2$]$_2$ from trivinyl cyclohexane and ethanol dithiol. (2) |
| E1262 VII | 529 | 728 | 3 | -- | ⬡—[CH$_2$CH$_2$S(CH$_2$)$_4$SH]$_3$ from trivinyl cyclohexane and 1,4-butane dithiol. (2) |
| E1263 VII |  | 1698 | 2 |  | HS[(CH$_2$)$_4$SCH$_2$CHS]$_n$(CH$_2$)$_4$-SH (1)<br>                         CH$_3$<br>from methylacetylene and 1,4-butane dithiol. |

(1) Polythioether derived from methylacetylene and 1,4-butane dithiol, the preparation of which is described in U.S. 3,592,798 incorporated herein by reference.

(2) Method for preparing these polythiols are taught in U.S. patent 3,625,925 incorporated herein by reference.

In addition to the polythiols of Table VIII, the Thiokol liquid polysulfide dithiol rubber LP3 was also evaluated. The compositions and the effect of Cobalt 60 radiation on these compositions is shown in Table IX.

TABLE IX

| | 1 | 2 | 3 | 4 | 5 | 6 | 7 | 8 | 9 |
|---|---|---|---|---|---|---|---|---|---|
| Chlorinated butyl rubber | 100 | 100 | 100 | 100 | 100 | 100 | 100 | 100 | 100 |
| Zinc Oxide | 5 | 5 | 5 | 5 | 5 | 5 | 5 | 5 | 5 |
| Stearic Acid | 1 | 1 | 1 | 1 | 1 | 1 | 1 | 1 | 1 |
| E1255 VII | — | 2 | 4 | | | | | | |
| E1221 VIII | | | | 1.3 | 2.6 | | | | |
| E1260 VI | | | | | | 2.3 | | | |
| E1262 VII | | | | | | | 2.5 | | |
| E1263 VIII | | | | | | | | 9.4 | |
| Thiokol LP3 | | | | | | | | | 5.0 |
| | 1 | 2 | 3 | 4 | 5 | 6 | 7 | 8 | 9 |
| 0 Megarad - 100% Co$^{60}$ Irradiation | Sol. 0.01 MR/min. | Sol. | Sol. | Sol. | Sol. | Sol. | Sol. | Sol. | Sol. |
| XL/cc × 10$^{-19}$ - | | | | | | | | | |
| 4.2 MR | 0.5 | 2.30 | | 2.02 | | 1.68 | 1.70 | 0.75 | 1.0 |
| 7.5 MR | | | | 2.53 | | | | | 1.30 |
| 9.4 MR | 1.15 | 2.92 | | | | 2.59 | 2.27 | 1.38 | |
| 12.4 MR | 1.40 | 3.25 | | 3.26 | | 3.0 | 2.51 | 1.67 | 1.82 |
| Irradiation by the Electron Beam | | 30 MR/min. | | | | | | | |
| XL/cc × 10$^{-19}$ - | | | | | | | | | |
| 5 MR | 0.31 | 1.35 | 2.34 | 1.22 | 2.14 | 0.66 | 0.72 | 0.52 | 0.43 |
| 10 MR | 0.60 | 1.80 | 3.07 | 1.61 | 3.05 | 1.27 | 1.18 | 0.84 | 0.79 |
| 15 MR | 0.77 | 2.0 | 3.17 | 1.92 | 3.94 | 1.70 | 1.46 | 1.12 | 0.88 |

It is evident that the presence of polythioether polythiols increase the crosslinking response of chlorinated butyl rubber three- to fourfold. The tri- and tetrathiols are superior to the dithiol represented by E1263 VIII.

The tetra functional E1221 VIII as shown in columns 4 and 5 is especially noteworthy because of its ability to promote the crosslinking response at quite low concentration levels. The commercial Thiokol rubber has only a mildly activating effect under Cobalt 60 radiation which appears to be further reduced under the higher dose rates of the electron beam.

EXAMPLE 6

The polythioether polythiols of this invention will promote the radiation crosslinking of chlorinated butyl rubber in the absence of zinc oxide and stearic acid as demonstrated by the results in Table X.

TABLE X

| Component[1] | 1 | 2 | 3 |
|---|---|---|---|
| Chlorinated butyl rubber HT 10-68 | 100 | 100 | 100 |
| Zinc Oxide | — | 5 | 5 |
| Stearic Acid | — | 1 | 1 |
| E1255 VII | 2 | 2 | — |
| Crosslinked density after Co$^{60}$ and electron beam exposure is expressed as XL/cc × 10$^{-19}$ on the basis of the original polymer volume. | | | |
| Co$^{60}$ Radiation | | | |
| 4.2 MR | 2.54 | 2.30 | .5 |
| 9.4 MR | 2.47 | 2.92 | 1.15 |
| 12.4 MR | 2.41 | 3.25 | 1.40 |
| Electron Beam | | | |
| 5 MR | 1.50 | 1.35 | 0.3 |
| 10 MR | 1.63 | 1.80 | 0.6 |
| 15 MR | 1.63 | 2.10 | 0.77 |

[1]Parts per 100 parts of elastomer by weight.

Although zinc oxide and stearic acid are not essential for radiation cure, they enhance the effect of the polythiols on radiation cure.

EXAMPLE 7

A series of experiments were conducted to determine whether other smaller molecular structures containing active hydrogen species would enhance the radiation crosslinking response of chlorinated butyl rubber. Included in these studies were mono-, di- and trithiols as shown in Table XI.

TABLE XI

| Components[1] | 1 | 2 | 3 | 4 | 5 | 6 |
|---|---|---|---|---|---|---|
| Chlorinated Butyl rubber HT-10-68 | 100 | 100 | 100 | 100 | 100 | 100 |
| Zinc Oxide | 5 | 5 | 5 | 5 | 5 | 5 |
| Stearic Acid | 1 | 1 | 1 | 1 | 1 | 1 |
| 1-butane thiol (.011 SH/gm) | | .95 | | | | |
| 1,4-butane dithiol (.016 SH/gm) | | | | .7 | | |
| 1,2,3-propane trithiol (.021 SH/gm) | | | | | .5 | |
| Phenyl Phosphine (.0091 F/gm) | | | | | | 1.1 |
| Diphenyl Silane (.0054 F/gm) | | | | | | 1.85 |

[1]Parts per 100 parts of elastomer by weight.

Functionalities per gram are shown adjacent to each additive and the amounts added would be comparable to the functionality of 2 parts of E1255 VII added to 100 parts of chlorinated butyl rubber. These obnoxious and sometimes toxic chemicals were added to chlorinated butyl rubber, zinc oxide, stearic acid masterbatch by solution mixing. Solutions were made in n-pentane and solid films recovered by room temperature evaporation in a hood followed by vacuum drying at room temperature. All films prior to irradiation with Co$^{60}$ source were soluble in cyclohexane. Crosslinking densities of the networks were obtained as a function of dose levels and are shown below in Table XII.

TABLE XII

| | 1 | 2 | 3 | 4 | 5 | 6 |
|---|---|---|---|---|---|---|
| XL/cc × 10$^{-19}$ Orig. Polymer Volume after | | | | | | |
| 0 MR | | All Soluble | | | | |
| 3.8 MR | .33 | Loose Gel | .98 | 2.3 | .63 | .62 |
| 7.4 MR | 1.36 | .6 | 1.55 | 2.0 | 1.39 | 1.28 |
| 12.3 MR | 1.55 | .81 | 1.59 | 2.2 | 1.82 | 1.40 |

A comparison of the data in Table XII shows that the monothiol of column 2 has a retarding effect upon radiation-induced crosslinking over the control column 1. The dithiol has a very modest activating effect, as do the phosphine and to a lesser extent, the silane as shown in columns 3, 5, and 6. The trithiol reflecting some of the activity of the polythioether polythiols has a more pronounced activating effect, although it does not appear to progress as radiant energy absorbed is increased. On a functionality basis, it can be considered inferior to the several types of polythioether polythiols evaluated.

EXAMPLE 8

Prior experiences have shown that radiation precure of chlorinated butyl rubber subsequently compounded with ingredients that promote chemical thermal curing, generally detracted from the subsequent thermal cure.

Table XIV shows the effect of polythiol E1255 VII on thermal cure after a precure by electron beam exposure.

TABLE XIV

EFFECT OF RADIATION PRECURE UPON SUBSEQUENT THERMAL CURE AT 20'–307°F COMPARED TO A THERMAL CURE

Composition: Chlorinated Butyl HT 10–68 - 100
Zinc Oxide - 5
Stearic Acid - 1
PTEPT (E1255 VII) as indicated Crosslinks Generated on Basis of Original Polymer Volume XL/cc × $10^{-19}$

| Parts of Polythiol per 100 Parts of Chlorinated Butyl Rubber | Beam 5MR | After Electron Exposure 10 MR | (RC) 15 MR | After Thermal Cure (TC) Only | After TC+RC | $\frac{TC+RC}{TC} \times 100$ |
|---|---|---|---|---|---|---|
| 0 pt. E1255 Control | .29 | — | — | 1.57 | 1.15 | 72% |
|  | — | .50 | — | 1.57 | 1.06 | 68 |
|  | — | — | .62 | 1.57 | 1.12 | 71 |
| 1 pt. E1255 | .55 | — | — | 2.12 | 1.97 | 93% |
|  | — | .79 | — | 2.12 | 1.65 | 78 |
|  | — | — | 1.13 | 2.12 | 1.59 | 75 |
| 2 pt. E1255 | 1.35 | — | — | 2.65 | 2.42 | 91% |
|  | — | 1.78 | — | 2.65 | 2.37 | 90 |
|  | — | — | 2.06 | 2.65 | 2.30 | 87 |
| 4 pt. E1255 | 2.34 | — | — | 3.39 | 3.90 | 115% |
|  | — | 3.07 | — | 3.39 | 3.73 | 110 |
|  | — | — | 3.17 | 3.39 | 3.48 | 103 |

These results show that at 1 pt. per 100 of polythiol there is a subtractive effect on the thermal cure; however, at higher levels the effect is additive.

EXAMPLE 9

Various polythiols were compared for their effectiveness with E1221 VIII polythiol. The three thiols tested in these experiments are as follows:

```
98-1    Trimethylol propane tris-thioglycolate
        C₂H₅C(CH₂OCOCH₂SH)₃   Formula weight  = 398
                               Molar equiv.
                               SH/gm           = 3/398
                                               = 0.0076
98-2    Pentaerythritol tetra 3 mercaptoprorionate
        C(CH₂OCOCH₂CH₂SH)₄    Formula weight  = 488
                               Molar equiv.
                               SH/gm           = 4/488
                                               = 0.0082
```

These two thiol containing ester structures were compared with a polythioether polythiol of similar molecular weight and functionality per gram.
98-3 E1221 III from trivinylcyclohexane and $H_2S$.

The structure based upon an experimental molecular weight of 500 indicates a single degree of coupling to provide on an average of monothioether polythiol.

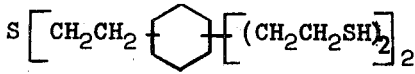

Formula weight = 495
Found by VPO, $M_n$ = 500
Molar equiv. SH/gm =
  4/500
  = 0.0080

Formulations were prepared and exposed to electron beam irradiation. The results are shown in Table XV.

TABLE XV

POLYTHIOL COMPOUNDS AS RADIATION CURE PROMOTERS OF CHLORINATED BUTYL RUBBER - EXPOSURE TO ELECTRON BEAM AT 30 MEGARADS PER MINUTE
Parts by Weight

| Component |  | 1 | 2 | 3 | 4 | 5 | 6 | 7 |
|---|---|---|---|---|---|---|---|---|
| Chlorinated Butyl Rubber HT 10-66 |  | 100 | 100 | 100 | 100 | 100 | 100 | 100 |
| Zinc Oxide |  | 5 | 5 | 5 | 5 | 5 | 5 | 5 |
| Stearic Acid |  | 1 | 1 | 1 | 1 | 1 | 1 | 1 |
| Polythiol | 98-1 | — | 1.45 | 2.89 |  |  |  |  |
|  | 98-2 | — |  |  | 1.34 | 2.68 |  |  |
|  | 98-3 | — |  |  |  |  | 1.37 | 2.75 |

Sample films molded between mylar film at 175°F. - 1 minute. Exposed to 5, 10, 15 megarads at 30 MR/minute. Networks characterized by volume swell in cyclohexane: at 0 megarads samples were soluble.

| Additive | Control | 98-1 | | 98-2 | | 98-3 | |
|---|---|---|---|---|---|---|---|
| | 1 | 2 | 3 | 4 | 5 | 6 | 7 |
| Exposure 5 MR: | | | | | | | |
| % Volume Increase | 1545 | 1295 | 1196 | 1334 | 1282 | 670 | 634 |
| % Soluble Polymer | 16.3 | 13.3 | 12.4 | 14.0 | 13.7 | 5.6 | 4.2 |
| Mc × $10^{-3}$ | 64 | 48 | 42 | 51 | 47 | 16.5 | 15 |
| XL/cc × $10^{-19}$ | 0.37 | 0.52 | 0.59 | 0.48 | 0.53 | 1.56 | 1.78 |
| (O.P.V.) | | | | | | | |
| Exposure 10 MR: | | | | | | | |
| % Volume Increase | 1168 | 915 | 834 | 897 | 877 | 597 | 495 |
| % Soluble Polymer | 12.9 | 14.0 | 12.5 | 13.3 | 12.8 | 6.1 | 5.7 |
| Mc × $10^{-3}$ | 41 | 27.5 | 23.4 | 27 | 25.5 | 13.6 | 10 |
| XL/cc × $10^{-19}$ | 0.45 | 0.90 | 1.05 | 0.95 | 0.98 | 1.88 | 2.51 |
| Exposure 15 MR: | | | | | | | |
| % Volume Increase | 1040 | 817 | 724 | 738 | 712 | 553 | 446 |
| % Soluble Polymer | 12.8 | 14.3 | 12.1 | 12.5 | 12.2 | 6.8 | 4.8 |
| Mc × $10^{-3}$ | 39 | 23 | 18.2 | 19.5 | 18.2 | 12 | 8.4 |
| XL × $10^{-19}$ | 0.73 | 1.07 | 1.32 | 1.26 | 1.36 | 2.06 | 3.05 |

With column 1 as the control, the greater effectiveness of polythiol 98-3 can be observed in columns 6 and 7, as compared to 2 through 5. At the 5 MR exposure level, the ester structures (98-1; 98-2) on the basis of generated crosslinks (XL/cc) provide a response only marginally better than the control, while 98-3 provides an increase in crosslinking response of 5 to 6 times. This advantage is maintained at the higher dose levels. Under $Co^{60}$ gamma radiation, at 0.01 MR/minute, the ester structures 98-1, 98-2 displayed a three-fold advantage in crosslinking response when compared to the control with 98-3 providing a further advantage.

EXAMPLE 10

Conventional butyl rubber will degrade under gamma ray irradiation through main chain scission while in contrast a chlorinated butyl rubber possesses considerable crosslinking potential. The addition of the polythiols of this invention do not change the response of unhalogenated butyl rubber to radiation exposure. The samples irradiated are described in Table XVI.

TABLE XVI

EFFECT OF IRRADIATION UPON REGULAR BUTYL RUBBER IN THE PRESENCE AND ABSENCE OF POLYTHIOETHER POLYTHIOL

| | 1 | 2 | 3 |
|---|---|---|---|
| Butyl Rubber 268[1] | 100 | 100 | 100 |
| Zinc Oxide | 5 | 5 | 5 |
| Stearic Acid | 1 | 1 | 1 |
| E23231II Polythiol | — | 2.25 | 4.5 |

[1]Butyl rubber of 450,000 viscosity average molecular weight having about 1.5 mole % unsaturation and a Mooney Viscosity at 260°F. of about 55.

After irradiation, the polymers were still completely soluble in cyclohexane whereas the halogenated butyl rubbers cured under similar circumstances showed improved crosslink density.

EXAMPLE 11

Thiol structures that are not polythioether polythiols also have utility as coagents capable of accelerating the radiation-induced crosslinking of chlorinated butyl rubber as was demonstrated in Example 9. The experiments of Example 9 were repeated using Cobalt 60 irradiation instead of electron beam irradiation. These results are shown in Table XVII.

TABLE XVII

EFFECT OF OTHER POLYTHIOLS ON THE $Co^{60}$ IRRADIATION INDUCED CROSSLINKING OF CHLORINATED BUTYL RUBBER
(parts by weight)

| | 1 | 2 | 3 | 4 | 5 | 6 | 7 |
|---|---|---|---|---|---|---|---|
| Chlorinated butyl rubber HT-10-68 | 100 | 100 | 100 | 100 | 100 | 100 | 100 |
| Zinc Oxide | 5 | 5 | 5 | 5 | 5 | 5 | 5 |
| Stearic Acid | 1 | 1 | 1 | 1 | 1 | 1 | 1 |
| 98-1 | — | 1.45 | 2.89 | | | | |
| 98-2 | — | | | 1.34 | 2.68 | | |
| 98-3 (E1221) | — | | | | | 1.37 | 2.75 |

Test samples molded for 1 minute at 175°F. were soluble in cyclohexane (mylar film protected). These films were exposed to $Co^{60}$ radiation at 0.01 megarads per minute followed by crosslinked network analysis by volume swelling in cyclohexane with the following listed results.

| Physical Properties after $Co^{60}$ Irradiation at: | Control | 98–1 | | 98–2 | | E1221 | |
|---|---|---|---|---|---|---|---|
| | 1 | 2 | 3 | 4 | 5 | 6 | 7 |
| 5.1 MR | | | | | | | |
| % Vol. Increase | 1110 | 627 | 500 | 621 | 583 | 469 | 381 |
| % Soluble Polymer* | 8.8 | 3.3 | 1.9 | 3.1 | 2.5 | 0.7 | 0 |
| $Mc \times 10^{-3}$ | 37 | 15 | 10.3 | 14.8 | 13.0 | 9.4 | 6.7 |
| $XL/cc \times 10^{-19}$ | 0.69 | 1.79 | 2.57 | 1.84 | 2.05 | 2.87 | 4.0 |
| (Orig. Pol. Vol.) | | | | | | | |
| 8.7 MR | | | | | | | |
| % Vol. Increase | 764 | 506 | 397 | 492 | 399 | 409 | 305 |
| % Soluble Polymer | 5.4 | 3.3 | 1.5 | 1.7 | 1.7 | 2.2 | 0.3 |
| $Mc \times 10^{-3}$ | 21 | 10.5 | 7.2 | 10 | 7.2 | 7.3 | 4.7 |
| $XL/cc \times 10^{-19}$ | 1.28 | 2.49 | 3.64 | 2.65 | 3.64 | 3.52 | 5.67 |
| 13.0 MR | | | | | | | |
| % Vol. Increase | 684 | 450 | | 450 | | 366 | |
| % Soluble Polymer | 7.1 | 4.5 | | 4.0 | | 3.1 | |
| $Mc \times 10^{-3}$ | 17 | 8.7 | | 8.7 | | 6.1 | |
| $XL/cc \times 10^{-19}$ | 1.49 | 3.0 | | 3.01 | | 4.25 | |

*Including polythiols.

Although the thioether polythiol provides the greatest degree of radiation cure enhancement (based upon generated crosslinks per cc) on an equivalent functionality basis, the polythiols with ester structures were also effective as accelerating coagents. At the lowest megarad dose of 5.1, the E1221 additive enhanced generated crosslinks up to sixfold while the other additives registered a threefold improvement. The difference may be associated with coagent solubility in the hydrocarbon polymer medium. These data also illustrate that the sample E1221 additive would be one of the preferred structures from the standpoint effectiveness per unit weight.

EXAMPLE 12

The radiation cure of polybutadiene is well known in the art. Two typical polybutadienes were radiation cured using the method of this invention by preparing compositions which were molded into test samples of 0.025 thick films by press molding at 175°F. for 5 minutes between Mylar film. All samples were hydrocarbon-soluble prior to radiation treatment. Exposures were made under a 30 MR/min. electron beam accelerator for various dose levels. The results are shown in Table XVIII.

TABLE XVIII

| | 1 | 2 | 3 | 4 | 5 | 6 |
|---|---|---|---|---|---|---|
| Firestone Diene 55[1] | 100 | 100 | 100 | | | |
| Phillips Cis 4 PB[2] | | | | 100 | 100 | 100 |
| E1262 VII | | 3 | 3 | | 3 | 3 |
| Zinc Oxide | | | 5 | | | 5 |
| Stearic Acid | | | 1 | | | 1 |

[1] a butyl lithium polymerized polybutadiene which has an approximate structure: 45% 1,4 cis, 45% 1,4 trans, 10% 1,2 (vinyl pendant groups) butadiene addition.
[2] polybutadiene which has an approximate structure: 92% 1,4 cis with some 1,4 trans and 2% 1,2 addition of butadiene.

| | | | Firestone Diene 55 | | | Phillips Cis 4 PB | | |
|---|---|---|---|---|---|---|---|---|
| | | | 1 | 2 | 3 | 4 | 5 | 6 |
| Physical Properties after irradiation at: | | | | | | | | |
| 5 MR — | % Volume Increase | | 1002 | 353 | 258 | 1115 | 594 | 522 |
| | % Soluble | | 9.0 | 2.2 | 1.7 | 11.1 | 7.4 | 7.1 |
| | $Mc \times 10^{-3}$ (gel) | | 24 | 5 | 3.1 | 29 | 11 | 9.1 |
| | $XL/cc \times 10^{-19}$ | | 1.06 | 5.57 | 9.25 | 0.96 | 2.41 | 2.97 |
| | (Orig. Pol. Vol.) | | | | | | | |
| 10 MR — | % Volume Increase | | 505 | 271 | 221 | 576 | 361 | 328 |
| | % Soluble | | 3.3 | 1.1 | 1.3 | 5.5 | 4.3 | 4.5 |
| | $Mc \times 10^{-3}$ | | 8.4 | 3.3 | 2.5 | 10.4 | 5.2 | 4.5 |
| | $XL/cc \times 10^{-19}$ | | 3.19 | 8.3 | 11.35 | 2.55 | 5.3 | 6.11 |
| 15 MR — | % Volume Increase | | 395 | 256 | 209 | 445 | 298 | 274 |
| | % Soluble | | 1.8 | 0.9 | 1.3 | 4.3 | 3.4 | 3.6 |
| | $Mc \times 10^{-3}$ | | 6.0 | 3.1 | 2.3 | 7.2 | 3.9 | 3.4 |
| | $XL/cc \times 10^{-19}$ | | 4.71 | 9.51 | 12.6 | 3.92 | 7.14 | 8.1 |

Columns 1 and 4 are the respective polymer controls with no additives, columns 2 and 5 have just the 3 percent of added E1,262 VII and columns 3 and 6 are further supported with zinc oxide and stearic acid. The accelerating effect for either elastomer by the PTEPT is marked with further enhancement by zinc oxide, stearic acid on the basis of any network parameter. This is shown by a reduction in volume swelling and soluble polymer as well as by a smaller molecular weight between effective crosslinks. Crosslink density is increased manyfold, as much as nine times for the Diene 55 at 5 MR exposure. The Diene 55 is more responsive presumably due to its larger amount of vinyl pendant groups. Data of this nature reveal the tremendous potential for the precuring of polydiene elastomers at markedly reduced radiation dose levels.

The olefinically unsaturated polymers of this invention may be sulfur vulcanized subsequent to radiation curing. The radiation precure has process advantages where handling of shapes on sheets is necessary prior to vulcanization. Sulfur vulcanization may be carried out using free sulfur and accelerators or in the absence of free sulfur using sulfur donors. The term "sulfur vulcanized" means vulcanization using either free sulfur or sulfur donors. Both methods of sulfur vulcanization are well known to the art and are discussed in detail in Chapters 2 and 3 of *Vulcanization and Vulcanizing Agents*, W. Hofmann, Palmerton Publishing Co., New York (1967) incorporated herein by reference.

Illustrative examples of accelerators which may be used in the sulfur cure of polymers of this invention are dithiocarbamates, xanthates, thiurams, thiazoles, aldehyde-amine accelerators and basic accelerators such as guanidine accelerators. Specific examples of these accelerators are zinc dimethyl dithiocarbamate, zinc diethyl dithiocarbamate, ammonium-N'-pentamethylene dithiocarbamate, tellurium diethyl dithiocarbamate, sodium isopropyl xanthate, zinc butyl xanthate, tetramethyl thiuram monosulfide, tetraethyl thiuram disulfide, dimethyl diphenyl thiuram disulfide, 2 mercaptobenzothiazole, etc.

It will be evident to those skilled in the art that the aforegoing examples demonstrated that polythiols having at least three thiol groups which are effective cure enhancers for the radiation curing of SBR polybutadiene and chlorinated butyl rubber. These polythiols preferably have a molecular weight of at least 150 and preferably less than 3,000, more preferably about 200 to 1,000, most preferably about 250 to about 400. The preferred polythiols are hydrocarbon polythioether polythiols. These cure enhancers are incorporated in the polymer at about 0.5 to about 6 parts per hundred (phr) by weight of the rubber, more preferably about 1 to about 3 phr.

Useful dithiols are hydrocarbon dithiols such as dodecane dithiol, dipentene dimercaptan, vinyl cyclohexene dimercaptan. Such dithiols are generally prepared by reacting a large excess of hydrogen sulfide with a diolefin or acetylene.

More preferred dithiols are thioether dithiols such as those derived by the reaction of excess hydrogen sulfide or dithiols with diunsaturates, such as ethylene diacrylate and methylacetylene.

Even more preferred are trithiols such as hydrocarbon trithiols exemplified by triallyl cyanurate trimercaptan, triacryloyl triazine trimercaptan, cyclododecatriene trimercaptan, trivinyl cyclohexane trimercaptan, vinyl butyl acetylene trimercaptan. Such trithiols are prepared by reacting a very large excess of hydrogen sulfide with a triunsaturated compound.

Also highly preferred are polythiols containing more than three thiol groups such as a low molecular weight polybutadiene polymercaptan.

Most preferred are thioether trithiols, tetrathiols and thioethers having an even higher thiol functionality. Such compounds are prepared by the addition of excess hydrogen sulfide and excess dithiols to trienes and polyenes. Especially preferred species are derived by the addition of $H_2S$ and alkylene dithiols to trienes, especially trivinyl compounds. Thioether polythiols in general contain one, two, three or more thioether groups. The number of thioether groups is about 1 to 100, preferably 1 to 25, more preferably 1 to 10, most preferably 1 to 5. The number of thioether groups is limited by economic considerations since these polythiols are used on an equivalent thiol basis.

Although it has been shown that conventional butyl rubber of low unsaturation cannot be radiation cured, the present invention is applicable to the more highly unsaturated isoolefin-conjugated diolefin polymers; see U.S. Pat. application Ser. No. 151,038, filed June 8, 1971, incorporated herein by reference for a description of these polymers and their method of preparation.

The improved radiation curing process of this invention is applicable to any olefinically unsaturated elastomer which has a number average molecular weight ($M_n$) of at least 10,000 and contains (1) at least 15 mole percent unsaturation or (2) at least 0.5 mole percent halogen, e.g., chlorine in the allylic form. Both types of functionality may be present in the same polymer. For example, halogenated conjugated dienes, polymers and copolymers, e.g. polychloroprene, contain both the requisite level of unsaturation and the allylic halogen.

The elastomers suitable for use in the practice of this invention preferably have a $M_n$ of at least 50,000, more preferably at least 100,000, most preferably at least 120,000.

What is claimed is:

1. In a process for the curing of an elastomer having a number average molecular weight of at least 50,000 using ionizing radiation, wherein said elastomer is an olefinically unsaturated elastomer having (1) at least 15 mole % unsaturation the improvement which comprises incorporating into the elastomer vulcanization mixture about 0.6 to about 6 parts per hundred by weight of elastomer of a cure enhancer comprising a hydrocarbon polythiol having about 3 to about 5 thiol groups and a molecular weight of about 200–1,000 selected from the group consisting of (1) the reaction product of cyclododecatriene and 1,3 propane dithiol, (2) the reaction product of trivinylcyclohexane and $H_2S$, (3) the reaction product of trivinylcyclohexane and ethane dithiol, or (4) the reaction product of trivinylcyclohexane and 1,4 butanedithiol.

2. The process of claim 1 wherein the elastomer is styrene-butadiene rubber or polybutadiene.

3. The process of claim 1 wherein the cure enhancer has a molecular weight of about 250 to about 4,000.

4. The process of claim 1 wherein the cure enhancer is incorporated into the elastomer at about 0.5 to about 6 parts by weight per one hundred parts of elastomer.

5. The process of claim 4 wherein the cure enhancer is incorporated at about 2 to about 4 parts by weight per 100 parts of elastomer.

6. The process of claim 1 wherein the elastomer is styrene-butadiene rubber and the cure enhancer is (1) the reaction product of trivinylcyclohexane and $H_2S$ or (2) the reaction product of trivinylcyclohexane and 1,3 propanedithiol.

7. The composition prepared by the process of claim 1.

8. The sulfur vulcanized composition of the product of claim 7.

9. The process of claim 1 wherein the cure enhancer is the reaction product of cyclododecatriene and 1,3 propane dithiol.

10. The process of claim 1 wherein the curing enhancer is the reaction product of trivinylcyclohexane and $H_2S$.

11. The process of claim 1 wherein the cure enhancer is the reaction product of trivinylcyclohexane and ethane dithiol.

12. The process of claim 1 wherein the cure enhancer is the reaction product of trivinylcyclohexane and 1,4 butanedithiol.

13. The process of claim 1 wherein the molecular weight of the elastomer is at least 100,000.

14. The process of claim 1 wherein the molecular weight of the thiol is about 150 to about 3,000.

15. The process of claim 1 wherein the curing enhancer is normally liquid at ambient temperature.

* * * * *